United States Patent Office 3,526,648
Patented Sept. 1, 1970

3,526,648
NOVEL 11β-ALKOXY-$\Delta^{1,3,5(10)}$-GONATRIENES
Daniel Bertin, Montrouge, and André Pierdet, Noisy-le-Sec, France, assignors to Roussel-UCLAF, Paris, France, a corporation of France
No Drawing. Filed June 2, 1967, Ser. No. 643,061
Claims priority, application France, June 7, 1966, 64,481; Sept. 7, 1966, 75,528; Jan. 18, 1967, 91,611
Int. Cl. C07c 169/08, 169/10
U.S. Cl. 260—397.45                15 Claims

ABSTRACT OF THE DISCLOSURE

Novel 11β-alkoxy-$\Delta^{1,3,5(10)}$-gonatrienes of the formula

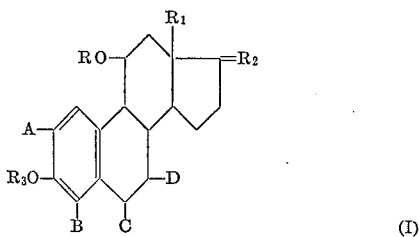

wherein R and $R_1$ are alkyl of 1 to 4 carbon atoms, $R_2$ is selected from the group consisting of

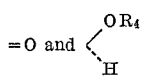

$R_3$ and $R_4$ are selected from the group consisting of hydrogen, alkyl of 1 to 4 carbon atoms and acyl of an organic carboxylic acid of 1 to 18 carbon atoms, A is selected from the group consisting of hydrogen, halogen and methyl, B is selected from the group consisting of hydrogen and methyl, C is selected from the group consisting of hydrogen, halogen and substituted and unsubstituted lower alkyl and D is selected from the group consisting of hydrogen and lower alkyl which possess estrogenic activity and their preparations.

OBJECTS OF THE INVENTION

It is an object of the invention to provide novel 11β-alkoxy-$\Delta^{1,3,5(10)}$-gonatrienes of Formula I.
It is another object of the invention to provide a novel process for the preparation of 11β-alkoxy-$\Delta^{1,3,5(10)}$-gonatrienes of Formula I.
It is a further object of the invention to provide novel estrogenic compositions.
It is an additional object of the invention to provide a novel method of treating ovarian irregularities and insufficiencies in warm-blooded animals.
These and other objects and advantages of the invention will become obvious from the following detailed description.

THE INVENTION

The novel 11β-alkoxy-$\Delta^{1,3,5(10)}$-gonatrienes of the invention have the formula

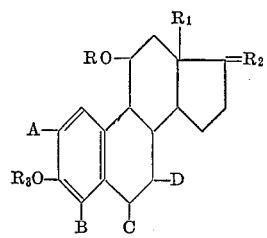

wherein R and $R_1$ are alkyl of 1 to 4 carbon atoms, $R_2$ is selected from the group consisting of

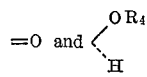

$R_3$ and $R_4$ are selected from the group consisting of hydrogen alkyl of 1 to 4 carbon atoms and acyl of an organic carboxylic acid of 1 to 18 carbon atoms, A is selected from the group consisting of hydrogen, halogen and methyl, B is selected from the group consisting of hydrogen and methyl, C is selected from the group consisting of hydrogen, halogen and substituted and unsubstituted lower alkyl and D is selected from the group consisting of hydrogen and lower alkyl. Particularly preferred are the compounds of Formula I when A, B, C and D are hydrogen and when $R_4$ and $R_3$ are alkyl, the alkyls are preferably methyl, ethyl, n-propyl, isopropyl and n-butyl.

Examples of suitable organic acids of 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid valeric acid, isovaleric acid, trimethyl acetic acid, caproic acid β-trimethyl propionic acid, hepanoic acid, caprylic acid, pelarginic acid, capric acid, undecyclic acid, lauric acid, myristic acid, palmitic acid and stearic acid; alkenoic acids, such as undecylenic acid and oleic acid, cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetc acid, 2,4-dichlorophenoxy acetic acid, 4-ttrbutylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromo-furane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

The compounds of Formula I have useful physiological properties, particularly an important estrogenic activity, especially when administered orally. This strong oral estrogenic activity of the compounds of Formula I is due to the introduction of the 11β-alkoxy group. This is unexpected since oral estrogenic activity in known compounds require the presence of a 17α-hydrocarbon radical and the presence of an 11β-hydroxyl group considerably reduces estrogenic activity. Moreover, due to the lack of a 17α-alkyl group, the compounds of Formula I do not exhibit any hepatonocivity which permits prolonged administration of the compounds. For example, 11β-methoxy-estradiol at the high dose of 1 mg./kg. has no effect on hepatic functions.

The most preferred compounds of Formula I are 11β-methoxy-$\Delta^{1,3,5(10)}$-estratriene - 3,17β - diol which has an estrogenic activity as intense as ethynyl estradiol; 3,11β-dimethoxy-$\Delta^{1,3,5(10)}$-estratriene-17-one and 11β-methoxy-$\Delta^{1,3,5(10)}$-estratriene-3-ol-17-one which have the same degree of estrogenic activity as ethynyl estradiol and are 30 times more active than estrone; and 11β-ethoxy-$\Delta^{1,3,5(10)}$-estratriene-3,17β-diol which has the same activity as its 11β-methoxy homolog.

The process of the invention for the preparation of 11β-alkoxy-13β-lower alkyl-17-oxygenated $\Delta^{1,3,5(10)}$-gonatriene-3-ols comprises isomerizing an 11β-alkoxy-13β-lower alkyl-17-oxygenated-$\Delta^{4,9}$-gonadiene-3-one of the formula

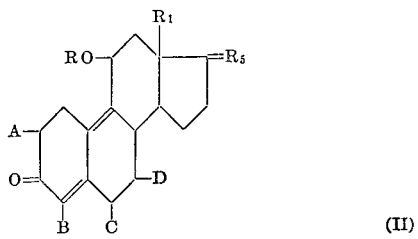

(II)

wherein R, $R_1$, A, B, C and D have the above definitions and $R_5$ is selected from the group consisting of

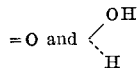

in the presence of a dehydrogenation catalyst, preferably palladium hydroxide, to form the corresponding 11β-alkoxy-13β-lower alkyl - 17 - oxygenated-$\Delta^{1,3,5(10)}$-gonatriene-3-ol. The said product may be esterified with an esterification derivative of an organic carboxylic acid of 1 to 18 carbon atoms such as the acid anhydride or acid chloride in the presence of a basic agent such as pyridine to form the corresponding 3-ester or etherified with an etherification agent such as an alkyl sulfate of 1 to 4 alkyl carbon atoms in the presence of an alkaline agent such as alkali metal hydroxide or an alkyl halide of 1 to 4 carbon atoms in the presence of an alkali metal hydride to form the corresponding 3-alkoxy derivative. If $R_5$ is

the corresponding 3,17-diesters or diethers will be formed. When $R_5$ is an oxo group, the latter may be reduced with a reducing agent, i.e., alkali metal borohydrides such as sodium or potassium borohydride.

The starting $\Delta^{4,9}$-gonadienes of Formula II can be prepared by the process described in copending, commonly assigned U.S. patent application Ser. No. 587,001 filed Oct. 17, 1966, now U.S. Pat. No. 3,472,884, which comprises reacting a $\Delta^{4,9}$-gonadiene-11β-ol-3-one with a lower alkanol in the presence of a strong acid in an aprotic solvent to form the corresponding 11β-alkoxy derivative.

The novel estrogenic compositions of the invention are comprised of a small but estrogenic amount of at least one compound of Formula I and a major amount of a pharmaceutical carrier. The compositions may be in the form of injectable solutions or suspensions, put up in ampoules or multiple dose flacons, in the form of implants, tablets, coated tablets, sublingual tablets, capsules, suppositories, ovules and ointments prepared by known methods.

The novel method of the invention for treating ovarian irregularities and insufficiencies in warm-blooded animals comprises administering to warm-blooded animals a safe and effective amount of at least one compound of Formula I. The said compounds may be administered orally, perlingually, transcutaneously, rectally or topically. The useful dosage is 0.00035 to 0.08 mg./kg. in the adult depending upon the method of administration and the specific product employed. The method is suitable for treating amenorrhea, dismenorrhea, repeated abortions, premenstrual disturbances and menopause.

In the following examples, there are described several preferred embodiments to illustrate the invention. However, it should be understood that the invention is not intended to be limited to the specific embodiments.

EXAMPLE I

Preparation of 11β-methoxy-$\Delta^{1,3,5(10)}$-estratriene-3-ol-17-one

Step A: Preparation of 11β-methoxy-$\Delta^{4,9}$-estradiene-3,17-dione.—0.5 gm. of $\Delta^{4,9}$-estradiene-11β-ol-3,17-dione were dissolved at room temperature in 25 cc. of methylene chloride containing 2% of methanol and after 5 mg. of p-toluene sulfonic acid were added, the reaction mixture was agitated for several minutes. Then the reaction mixture was poured into ice water, washed with water until the wash waters were neutral, and distilled to dryness under vacuum. The resulting residue was crystallized from ethyl ether to obtain 0.46 gm. of 11β-methoxy-$\Delta^{4,9}$-estradiene-3,17-dione having a melting point of 140° C.

The product occurred in the form of prisms, insoluble in water and dilute aqueous acids and alkalis, and soluble in most of the usual organic solvents.

In an analogous manner, $\Delta^{4,9}$-estradiene-11β-ol-3,17-dione was converted by the action of methylene chloride containing 2% of ethanol in the presence of p-toluene sulfonic acid into 11β-ethoxy-$\Delta^{4,9}$-estradiene-3,17-dione.

Step B: Preparation of 11β-methoxy-$\Delta^{1,3,5(10)}$-estratriene-3-ol-17-one.—12.3 gm. of 11β-methoxy-$\Delta^{4,9}$-estradiene-3,17-dione were dissolved in 1,230 cc. of methanol and then, under an atmosphere of nitrogen 7.38 gm. of palladium hydroxide were added and the mixture was held at reflux for one hour under agitation and a nitrogen atmosphere. Then the reaction mixture was cooled to 30° C., filtered, vacuum filtered and washed with methanol. The methanolic solutions were concentrated to about 50 cc., allowed to stand overnight at room temperature and filtered. The precipitate formed was triturated in methanol and dried at 80° C. to obtain 10.74 gm. (87.5% yield), of 11β-methoxy-$\Delta^{1,3,5(10)}$-estratriene-3-ol-17-one having a melting point of 264° C.

This compound is not described in the literature.

By working in an analogous manner, 11β-ethoxy-$\Delta^{4,9}$-estradiene-3,17-dione was converted into 11β-ethoxy-$\Delta^{1,3,5(10)}$-estratriene-3-ol-17-one.

This compound is not described in the literature.

EXAMPLE II

Preparation of 11β-methoxy-$\Delta^{1,3,5(10)}$-estratriene-3,17β-diol 7.57 gm. of 11β-methoxy-$\Delta^{1,3,5(10)}$-estratriene-3-ol-17-one were dissolved at reflux in 455 cc. of methanol and the solution was cooled. Then, 7.57 gm. of sodium borohydride were added thereto under agitation and the reaction mixture was held at reflux for one hour. Thereafter, acetic acid was added to obtain a pH value of 5–6, after which about 300 cc. of methanol were distilled off. The solution was iced for one hour and the precipitate formed was filtered, vacuum filtered, triturated first in iced methanol, then in water, and dried at 80° C. to obtain 7.20 gm. of a raw product which was purified by dissolution in a 3:2 mixture of methanol-methylene chloride, followed by concentration of the solution and washing the precipitate first with methanol, then with water, to obtain 11β-methoxy-$\Delta^{1,3,5(10)}$-estratriene-3,17β-diol having a melting point of 245° C. (yield=81%).

*Analysis.*—Calculated for $C_{19}H_{26}O_3$ (molecular weight =302.40): C, 75.46%; H, 8.67%. Found: C, 75.4%; H, 8.5%.

This compound is not described in the literature.

In analogous manner, 11β-ethoxy-$\Delta^{1,3,5(10)}$-estratriene-3-ol-17-one was converted into 11β-ethoxy-$\Delta^{1,3,5(10)}$-estratriene-3,17β-diol having a melting point of 227° C.

EXAMPLE III

Preparation of 3,11β-dimethoxy-$\Delta^{1,3,5(10)}$-estratriene-17-one 1.50 gm. of 11β-methoxy-$\Delta^{1,3,5(10)}$-estratriene-3-ol-17-one were dissolved in 135 cc. of ethanol and 21.7 cc. of potassium hydroxide solution. Next while agitating and cooling the mixture to 30–40° C., 21.7 cc. of methyl sulfate were added and the reaction mixture was refluxed for one hour. Then the reaction mixture was poured into a water-ice mixture and filtered and the precipitate formed was vacuum filtered, washed with water and dried at 80° C. to obtain 1.28 gm. of a raw product which was purified by dissolution at reflux in methanol, by concentration of the solution and icing and drying the solution to obtain 1.16 gm. of 3,11β-dimethoxy-$\Delta^{1,3,5(10)}$-estratriene-17-one, having a melting point of 194° C.

*Analysis.*—Calculated for: $C_{20}H_{26}O_3$ (molecular weight =314.41): C, 76.39%; H, 8.34%. Found: C, 76.2%; H, 8.4%.

In analogous manner, 11β-ethoxy-$\Delta^{1,3,5(10)}$-estratriene-3-ol-17-one was converted into 3-methoxy-11β-ethoxy-$\Delta^{1,3,5(10)}$-estratriene-17-one.

These compounds are not described in the literature.

EXAMPLE IV

Preparation of 3,11β,17β-trimethoxy-$\Delta^{1,3,5(10)}$-estratriene

Step A: Preparation of 3,11β-dimethoxy-$\Delta^{1,3,5(10)}$-estratriene-17β-ol.—Under an atmosphere of nitrogen, 0.210 gm. of 11β-methoxy-$\Delta^{1,3,5(10)}$-estratriene-3,17β-diol obtained above and 15 cc. of methanol were heated to reflux and then 2.4 cc. of potassium hydroxide and 2.4 cc. of methyl sulfate were slowly added thereto. The reaction mixture was poured into a water-ice mixture and filtered and the precipitate formed was vacuum filtered and washed with water to obtain 0.166 gm. of a raw product which was purified by subjecting it to chromatography through silica gel. Thus, 0.107 gm. of 3,11β-dimethoxy-$\Delta^{1,3,5(10)}$-estratriene-17β-ol was obtained in the form of a product in colorless crystalline needles which were soluble in the usual organic solvents, and insoluble in water. The product had a melting point of 148° C.

This compound is not described in the literature.

In analogous manner, 11β-ethoxy-$\Delta^{1,3,5(10)}$-estratriene-3,17β-diol was converted to 3-methoxy-11β-ethoxy-$\Delta^{1,3,5(10)}$-estratriene-17β-ol.

This compound is not described in the literature.

Step B: Preparation of 3,11β,17β-trimethoxy-$\Delta^{1,3,5(10)}$-estratriene.—Under agitation and a stream of nitrogen, 0.085 gm. of 3,11β-dimethoxy-$\Delta^{1,3,5(10)}$-estratriene-17β-ol, 5 cc. of tetrahydrofuran and 0.10 gm. of sodium hydride were heated to reflux and held at reflux for one hour and then cooled to about 35° C. Then 0.5 cc. of methyl iodide was added, and the reaction mixture was agitated for one hour. Then, another 0.5 cc. of methyl iodide was added and the reaction mixture was agitated for 2 hours and then cooled. Next the reaction mixture was poured into a water-ice mixture and extracted with ether. The organic phases were washed with water until the washwaters were neutral to obtain 0.130 gm. of a raw product which was purified by recrystallization from isopropyl ether to obtain 0.07 gm. of 3,11β,17β-trimethoxy-$\Delta^{1,3,5(10)}$-estratriene, having a melting point of 112° C.

This compound is not described in the literature.

In analogous manner, 3-methoxy-11β-ethoxy-$\Delta^{1,3,5(10)}$-estratriene-17β-ol was converted to 3,17β-dimethoxy-11β-ethoxy-$\Delta^{1,3,5(10)}$-estratriene.

This compound is not described in the literature.

EXAMPLE V

Preparation of 11β-ethoxy-$\Delta^{1,3,5(10)}$-estratriene-3,17β-diol

Step A: Preparation of 11β-ethoxy-$\Delta^{4,9}$-estradiene-17β-ol-3-one.—1 gm. of $\Delta^{4,9}$-estradiene-11β,17β-diol-3-one was dissolved in 20 cc. of chloroform and 50 cc. of chloroform containing 1% of ethanol and after 0.1 cc. of 65% perchloric acid was added, the mixture was agitated for 2 minutes. Then the reaction mixture was poured into a water-ice mixture and the organic phase was decanted, washed with water until neutral, dried over sodium sulfate and evaporated to dryness to obtain 1.1 gm. of a raw 11β-ethoxylated compound which was purified by chromatography through silica gel and by elution with a benzene-ethyl acetate mixture, (4:6) to obtain 0.9 gm. of 11β-ethoxy-$\Delta^{4,9}$-estradiene-17β-ol-3-one in the form of a solid, colorless product, soluble in most of the usual solvents and having a melting point of 128° C.

This compound is not described in the literature.

The starting product, $\Delta^{4,9}$-estradiene-11β,17β-diol-3-one was obtained according to the process described in U.S. Pat. No. 3,282,785.

Step B: Preparation of 11β-ethoxy-$\Delta^{1,3,5(10)}$-estratriene-3,17β-diol.—A mixture consisting of 900 mg. of 11β-ethoxy-$\Delta^{4,9}$-estradiene-17β-ol-3-one, 90 cc. of methanol and 900 mg. of palladium hydroxide was held at reflux for 1 hour under agitation and an atmosphere of nitrogen and then filtered and evaporated to dryness. The residue obtained was subjected to chromatography and triturated in isopropyl ether to obtain 96 mg. of 11β-ethoxy-$\Delta^{1,3,5(10)}$-estratriene-3,17β-diol having a melting point of 227° C. and a specific rotation $[\alpha]_D^{20}=+127°\pm3°$ (c.=0.4% in dioxane).

*Analysis.*—Calculated for $C_{20}H_{28}O_3$ (molecular weight=316.42): C, 75.9%; H, 8.92%. Found: C, 76.0%; H, 9.0%.

Infrared spectra: Presence of benzene ring at 1,626 cm.$^{-1}$, 1,587 cm.$^{-1}$ and 1,505 cm.$^{-1}$. Presence of associated OH.

Ultraviolet spectra: (in ethanol)

| | |
|---|---|
| Inflection toward 219–220 mμ | $E^{1\%}_{1\,cm.}=225$ |
| Inflection toward 229–230 mμ | $E^{1\%}_{1\,cm.}=157$ |
| Max. at 281 mμ | $E^{1\%}_{1\,cm.}=63$ |
| Inflection toward 287 mμ | $E^{1\%}_{1\,cm.}=57$ |

This compound is not described in the literature.

By using the preceding methods, the 2,4-dimethyl-11β-methoxy-$\Delta^{1,3,5(10)}$-estratriene-3,17β-diol was prepared.

This compound is not described in the literature.

PHARMACOLOGICAL STUDY (A) Estrogenic activity (1) Lauson test on rats.—The uterotrophic activity on rats was determined according to the test described by Lauson (Endocrinology, 24, 35, 1939), wherein the test compounds were subcutaneously administered once per day over a period of 3 days to rats 22 to 23 days old, weighing about 40 gm. each. The animals were sacrificed on the 4th day, and the uterus of each rat was removed, vacuum-dried and weighed. 11β-ethoxy-$\Delta^{1,3,5(10)}$-estratriene-3,17β-diol, used as a solution in olive oil admixed with 5% benzyl alcohol, was administered at total doses of 0.025γ, 0.05γ, 0.10γ and 0.20γ and estradiol was administered at total doses of 0.10γ, 0.20γ and 0.40γ. The results are summarized in Table I.

TABLE I

| Total doses | Weight of uterus in mg. | | | | |
| --- | --- | --- | --- | --- | --- |
| | 0.025γ | 0.05γ | 0.10γ | 0.20γ | 0.40γ |
| 11β-ethoxy-Δ¹,³,⁵⁽¹⁰⁾-estratriene-3,17β-diol | 29.60 | 53.54 | 68.78 | 75.64 | |
| Estradiol | | | | 46.66 | 67.16 | 83.62 |

Table I shows that 11β-ethoxy-Δ$^{1,3,5(10)}$-estratriene-3,17β-diol, when administered subcutaneously to rats, has a clearly superior uterotrophic activity to that of estradiol.

Using the same test procedure, 11β-ethoxy-Δ$^{1,3,5(10)}$-estratriene-3, 17β-diol was administered orally to rats at total dosages of 0.9γ, 1.8γ and 3.6γ and the product was very active at these dosages.

(2) Rubin test on mice.—The test of Rubin (Endocrinology, (1951), vol. 49, p 429) was used to determine estrogenic activity on female mice 19 to 21 days old. The animals received one administration of the test compounds, orally or subcutaneously, for 3 days and on the fourth day, the animals were killed and the uteruses were removed, dissected and weighed. The products were subcutaneously administered in 0.1 cc. of an oil solution and in 0.2 cc. of an aqueous suspension for oral administration. The results are summarized in Tables II and IIa.

TABLE II.—SUBCUTANEOUS ADMINISTRATION

| Total doses | Weights of uterus in mg. | | | | |
| --- | --- | --- | --- | --- | --- |
| | 0 | 0.01γ | 0.03γ | 0.09γ | 0.27γ |
| 11β-methoxy-Δ¹,³,⁵⁽¹⁰⁾-estratriene-3,17β-diol | 12.7 | 13.6 | 22.7 | 43.8 | 85.9 |
| Ethynyl estradiol | 11.7 | | 23.2 | 62.8 | 86.4 |

TABLE IIa.—ORAL ADMINISTRATION

| Total doses | Weights of uterus in mg. | | | | |
| --- | --- | --- | --- | --- | --- |
| | 0γ | 0.09γ | 0.27γ | 0.81γ | 2.43γ |
| 11β-methoxy-Δ¹,³,⁵⁽¹⁰⁾-estratriene-3,17β-diol | 11.9 | 22.1 | 61.1 | 110.9 | 114.4 |
| Ethynyl estradiol | | 18.8 | 19.4 | 65.5 | 119.9 |
| 11β-methoxy-Δ¹,³,⁵⁽¹⁰⁾-estratriene-3-ol-17-one | 17.1 | 19.7 | 28.3 | 60.9 | 108.0 |
| 3,11β-dimethoxy-Δ¹,³,⁵⁽¹⁰⁾-estratriene-17-one | 17.1 | 13.9 | 21.6 | 72.1 | 120.9 |
| Ethynyl estradiol | | 21.3±3.3 | 19.4±2.5 | 77.5±17.3 | 119.7±14 |

(3) Allen-Doisy test on rats.—The estrogenic activity was determined on castrated rats using the Allen-Doisy test as modified by Feyel-Cabanes (C. R. Soc. Biol., vol. 150, (1956), p. 1881). The test product was administered only once either as a solution in olive oil containing 5% benzyl alcohol (subcutaneous) or as an aqueous suspension (oral). Vaginal smears were taken daily beginning on the second day after the treatment. The rat unit (dose which caused estrus in rats within one day) of 11β-methoxy-Δ$^{1,3,5(10)}$-estratriene - 3,17β - diol amounted to about 10γ for subcutaneous administration and about 500γ for oral administration. The said product was as active as ethynyl estradiol orally and about 2 to 5 times less estrogenic subcutaneously.

(B) Hypocholesteroleminant action on the normal female rat

The test was conducted on groups of female rats with an average weight of 200 gm. each to which 11β-methoxy-Δ$^{1,3,5(10)}$estratriene-3,17β-diol utilized as a suspension in a dispersive aqueous liquid was orally administered.

The animals were treated once per day over a period of 10 days. One group of female rats of identical age and weight served as control. Samples of blood were taken on the 11th day to determine the total of the seric sterols.

Under the conditions of the test, 11β-methoxy-Δ$^{1,3,5(10)}$-estratriene-3,17-diol brought about a 45% reduction of the sterolemia at a daily dose of 50γ/kg. Under the same experimental conditions, ethynyl estradiol exerted a hypocholesteroleminant activity of the same order.

Various modifications of the compositions and method of the invention may be made without departing from the spirit or scope thereof.

We claim:

1. An 11β-alkoxy-Δ$^{1,3,5(10)}$-gonatriene of the formula

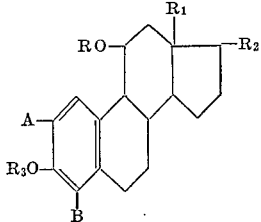

wherein R and R₁ are alkyl of 1 to 4 carbon atoms, R₂ is selected from the group consisting of

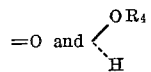

and R₃ and R₄ are selected from the group consisting of hydrogen and alkyl of 1 to 4 carbon atoms and A and B are selected from the group consisting of hydrogen and methyl.

2. A compound of claim 1 wherein A and B are hydrogen.

3. A compound of claim 2 wherein R and R₁ are methyl.

4. A compound of claim 2 wherein R is ethyl and R₁ is methyl.

5. A compound of claim 1, wherein the compound is 3,11β-dimethoxy-Δ$^{1,3,5(10)}$-estratriene-17-one.

6. A compound of claim 1 wherein the compound is 3-methoxy-11β-ethoxy-Δ$^{1,3,5(10)}$-estratriene-17-one.

7. A compound of claim 1 wherein the compound is 3,11β,17β-trimethoxy-Δ$^{1,3,5(10)}$-estratriene.

8. A compound of claim 1 wherein the compound is 3,17β-methoxy-11-ethoxy-Δ$^{1,3,5(10)}$-estratriene.

9. A compound of claim 1 wherein the compound is 11β-methoxy-Δ$^{1,3,5(10)}$-estratriene-3-ol-17-one.

10. A compound of claim 1 wherein the compound is 11β-methoxy-Δ$^{1,3,5(10)}$-estratriene-3,17β-diol.

11. A compound of claim 1 wherein the compound is 11β-ethoxy-Δ$^{1,3,5(10)}$-estratriene-3-ol-17-one.

12. A compound of claim 1 wherein the compound is 11β-ethoxy-Δ$^{1,3,5(10)}$-estratriene-3,17β-diol.

13. A compound of claim 1 wherein the compound is 3,11β-dimethoxy-Δ$^{1,3,5(10)}$-estratriene-17β-ol.

14. A compound of claim 1 wherein the compound is 3-methoxy-11β-ethoxy-Δ$^{1,3,5(10)}$-estratriene-17β-ol.

15. A compound of claim 1 wherein the compound is 2,4-dimethyl-11β-methoxy-Δ$^{1,3,5(10)}$-estratriene-3,17β-diol.

References Cited

Djerass: Steriod Reactions p. 389 (1963), Holden Day Inc., San Francisco, Calif.

HENRY A. FRENCH, Primary Examiner

U.S. Cl. X.R.

260—239.5, 239.55, 397.5; 424—243